United States Patent [19]

Sakai et al.

[11] Patent Number: 5,162,819
[45] Date of Patent: Nov. 10, 1992

[54] INFORMATION PROCESSING APPARATUS, INFORMATION PROCESSING METHOD, AND RECORDING MEDIUM EMPLOYED THEREFOR

[75] Inventors: Kunihiro Sakai, Isahara; Toshimitsu Kawase, Atsugi; Akihiko Yamano, Yokohama; Ryo Kuroda, Atsugi; Hiroyasu Nose, Zama, all of Japan

[73] Assignee: Canon Kabushiki Kaisha, Tokyo, Japan

[21] Appl. No.: 641,916

[22] Filed: Jan. 16, 1991

[30] Foreign Application Priority Data

Jan. 19, 1990 [JP] Japan .................... 2-10341
Aug. 6, 1990 [JP] Japan .................... 2-206864

[51] Int. Cl.⁵ .................................... G01D 15/06
[52] U.S. Cl. .................................... 346/153.1; 365/174; 365/112; 365/114
[58] Field of Search ............... 346/153.1, 155, 158, 346/160, 135.1; 365/112, 114, 118, 151, 174; 369/100, 101, 126; 430/69

[56] References Cited

U.S. PATENT DOCUMENTS

| | | | |
|---|---|---|---|
| 4,125,319 | 11/1978 | Frank et al. | 359/296 |
| 4,429,323 | 1/1984 | Ohtsuka | 346/153.1 |
| 4,575,822 | 3/1986 | Quate | 365/174 |
| 4,835,083 | 5/1989 | Sakai et al. | 430/130 |
| 4,897,731 | 1/1990 | Kuehnle | 346/158 X |
| 4,929,524 | 5/1990 | Sakai et al. | 430/56 |
| 4,945,515 | 7/1990 | Ooumi et al. | 369/126 X |
| 5,038,322 | 8/1991 | Van Loenen | 365/114 |
| 5,043,578 | 8/1991 | Güethner et al. | 250/307 |
| 5,051,977 | 9/1991 | Goldberg | 369/126 |

OTHER PUBLICATIONS

"Surface Studies by Scanning Tunneling Microscopy" Binning et al. Apr. 30, 1982 *Physical Review Letters* pp. 57–60.

*Primary Examiner*—Benjamin R. Fuller
*Assistant Examiner*—Randy W. Gibson
*Attorney, Agent, or Firm*—Fitzpatrick, Cella, Harper & Scinto

[57] ABSTRACT

An information processing apparatus comprises a recording medium having at least an underlying electrode and a photoconductive thin film and having an insulating or semiconducting recording region capable of accumulating an electric charge; and a probe electrode. The invention relates to an information processing method, comprising employing the apparatus; applying a voltage between the underlying electrode and the probe electrode to inject the electric charge into the recording region to record information.

18 Claims, 5 Drawing Sheets

INFORMATION PROCESSING APPARATUS, INFORMATION PROCESSING METHOD, AND RECORDING MEDIUM EMPLOYED THEREFOR

BACKGROUND OF THE INVENTION

1. Field of the Invention

The present invention relates to an information processing apparatus including a recording means and a reproducing means having both high-density recording capacity and erasing functionality. The present invention also relates to an information processing method including recording and erasing, and further to a recording medium employed therefor.

More particularly, the present invention relates to a recording-reproducing apparatus and a recording-reproducing-erasing method by which recording is conducted by accumulating an electric charge on a photoconductive layer, reproduction of the recorded information is conducted by detection of the electric charge quantity as an electric current or a voltage with a probe electrode, and erasure of the information is conducted by discharging the accumulated electric charge by light projection.

2. Related Background Art

In recent years, memory elements and memory systems are utilized in a variety of application fields such as computers and related apparatuses, video discs, digital audio discs, and so forth, and are the key materials in electronics industries. Generally, memory systems are required to have the performances below:

(1) large capacity in small volume,
(2) quick response in recording and reproduction,
(3) low error rate,
(4) low power consumption,
(5) high productivity and low cost, and so forth. Heretofore, magnetic memory devices and semiconductor memory devices have been principally used for the memory systems. As the results of the recent progress of laser technique, there have come to be used optical memory devices and the like employing an inexpensive and high-density recording medium. However, the memory devices or methods are desired practically which have still larger capacity and smaller volume to adapt to the family use of computors and increase of image information.

On the other hand, scanning tunnel microscopy (hereinafter referred to as "STM") has been developed which enables direct observation of the electronic structure of an atom on a surface of a conductor (G. Binnig et al., Phys. Rev. Lett. 49 (1982) 57). By the STM, a real spatial image of an amorphous substance as well as a single crystal has become measurable with remarkably high resolution (at a nanometer level or less). The STM utilizes the tunnel current which flows through a metallic probe when the metallic probe is brought close to an electroconductive substance at a distance of about 1 nm. This current is extremely sensitive to the change of the above distance, so that the surface structure of a real spatial image can be traced by scanning with a probe so as to maintain the tunnel current constant. The analysis by STM has been applicable only to electroconductive materials. However, the STM has begun to be utilized for analysis of the structure of a thin insulating film formed on a surface of an electroconductive material. Since the apparatus and the means for the STM are dependent on detection of a minute current, the observation can advantageously be conducted without impairing the medium and with low electric power. Furthermore, the operation of STM may be conducted in atmospheric environment.

Accordingly, the STM is promising in a broad range of applications. In particular, use as a reproduction apparatus is actively studied for reading out information written in a sample with high resolution. For example, Quate, et al. of Stanford University disclosed a method of injecting an electric charge to an insulating layer interface by applying a voltage with an STM probe (for recording) and detecting the charge by a tunnel current flowing the probe (for reproduction); (C. F. Quate, U.S. Pat. No. 4,575,822). By utilizing such a method, a memory apparatus of extremely high density can readily be realized.

Figure 6:
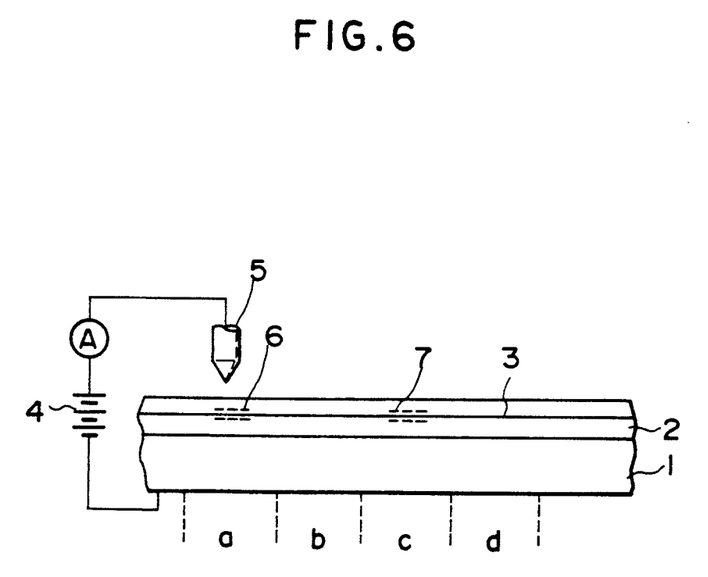
FIG. 6 illustrates an outline of a conventional recording-reproducing apparatus which records and reproduces information by accumulation of electric charge at an insulating film interface of a hetero structure.

The process is specifically conducted by the procedure mentioned below by referring to FIG. 6 as an example. A recording medium suitable for the process comprises an electroconductive silicon semiconductor substrate 1 doped with an impurity, a silicon oxide film layer 2 formed on the substrate 1, and a silicon nitride film layer 3 formed on the silicon oxide film layer 2. A probe electrode 5 is brought into contact with the silicon nitride film layer. A predetermined voltage is applied to the insulating layer by applying a voltage between the probe and the substrate by means of a voltage applying apparatus 4. Consequently, electrons tunnel through the insulating layer, and an electric charge accumulates at the interface in the insulating layer. In FIG. 6, the symbols a, b, c, and d respectively denote regions of first data, second data, third data and fourth data. The numerals 6 and 7 denote the charge (or data) at the positions a and c, respectively. The probe is then removed from the insulating layer surface, leaving the electron having tunneled in a trapped state. In reading out the information recorded by the trapped electrons, the probe is brought sufficiently close to the silicon nitride film layer and the trapped electrons, and a voltage is applied between the substrate and the probe so as to produce a tunnel current, and simultaneously the distance of the probe from the insulating surface is varied.

Usually, the probe bias for reading out the data is of opposite polarity to the probe bias for the data recording. The measured tunnel current denotes the presence or absence of an accumulated charge at the interface in the insulating layer interface. The region for accumulation of 1 bit of data is as small as an order of $10^{-4} \mu m^2$ of the surface area. Consequently, a memory device having a large capacity, for example, of 100M byte can be made in a level of as small as 1 $cm^3$ in volume.

Quate et al. showed in the aforementioned patent specification that information recorded by "disorder" (e.g., physical roughness, variation of an electric state, etc.) formed by physical probing, a focused laser beam, an electron beam, adhesion of fine particles, or the like on the surface of a recording medium as well as the charge accumulation can be readily be read out by utilizing the tunnel current. Practically, the recording by charge accumulation is promising in view of the density, reproducibility, and readiness of the recording.

The above-mentioned recording-reproducing method, however, involves a disadvantage that the information once recorded is not readily erasable. In an erasing step in the above method, access with a probe is required to every one bit just like in the recording step. Therefore, the time for erasure increases in proportion to the amount of erasure, and rapid response is not readily attained for a broad range of erasure. Further, a bias voltage of polarity opposite to the accumulated charge have to be applied. Under such circumstances, high controllability is required for the voltage, the distance between the medium and the probe, and so forth. Deviation from the optimum conditions may cause insufficiency of erasure, or further accumulation of an opposite polarity charge. Accordingly, an erasure mechanism or procedure is desired which is accessible to many bits at a time without use of a probe.

SUMMARY OF THE INVENTION

The present invention intends to provide an information processing apparatus, an information processing method, and a recording medium employed therefor which are free from the above-mentioned disadvantages of the prior art used in recording and reproduction by charge accumulation, giving remarkable high recording density, and making erasure easy.

The intention is attained by the present invention.

According to an aspect of the present invention, there is provided an information processing apparatus comprising a recording medium having at least an underlying electrode and a photoconductive thin film and having an insulating or semiconducting recording-region capable of accumulating an electric charge; and a probe electrode.

According to another aspect of the present invention, there is provided an information processing apparatus comprising a recording medium having at least a photoconductive thin film layer formed on an underlying electrode and having an insulating or semiconducting recording-layer capable of accumulating an electric charge; a light-projecting mechanism for projecting light onto the recording medium; and a probe electrode.

According to still another aspect of the present invention, there is provided an information processing method, comprising employing a recording medium having at least an underlying electrode and a photoconductive thin film and having an insulating or semiconducting recording region capable of accumulating an electric charge, and a probe electrode; applying a voltage between the underlying electrode and the probe electrode to inject the electric charge into the recording region to record information.

According to a further aspect of the present invention, there is provided an information processing method, comprising employing a recording medium having at least an underlying electrode and a photoconductive thin film and having an insulating or semiconducting recording region capable of accumulating an electric charge, and a probe electrode; applying a voltage between the underlying electrode and the probe electrode to inject the electric charge into the recording region to record information; and reproducing recorded information by detecting the quantity of the electric charge in the recording region by use of a probe electrode.

According to a still further aspect of the present invention, there is provided an information processing method, comprising employing a recording medium having at least an underlying electrode and a photoconductive thin film and having an insulating or semiconducting recording region capable of accumulating an electric charge, and a probe electrode; applying a voltage between the underlying electrode and the probe electrode to inject the electric charge into the recording region to record information; and erasing the recorded information by projecting light to the recording region to raise temporarily electroconductivity of the photoconductive thin film to discharge the accumulated electric charge through the photoconductive thin film.

According to a still further aspect of the present invention, there is provided an information processing method, comprising employing a recording medium having at least an underlying electrode and a photoconductive thin film and having an insulating or semiconducting recording region capable of accumulating an electric charge, and a probe electrode; applying a voltage between the underlying electrode and the probe electrode to inject the electric charge into the recording region to record information; reproducing recorded information by detecting the quantity of the accumulated electric charge in the recording region by use of a probe electrode; and erasing the recorded information by projecting light to the recording region to raise temporarily electroconductivity of the photoconductive thin film to discharge the accumulated electric charge through the photoconductive thin film.

According to a still further aspect of the present invention, there is provided a recording medium suitable for information processing including recording, reproduction, and erasure by use of a probe electrode: comprising at least a photoconductive thin film layer formed on an underlying electrode and an insulating or semiconducting recording-layer capable of accumulating an electric charge.

DETAILED DESCRIPTION OF THE PREFERRED EMBODIMENT

The present invention employs a photoconductive thin film structure as a support for a recording region capable of accumulating an electric charge, providing an erasing mechanism and an erasing method which conduct erasing by light projection to raise temporarily the electroconductivity of the thin film and to discharge the accumulated electric charge through the thin film without using a probe, and allows simultaneous access to numbers of bits. The invention is described below in detail.

In principle, the recording is conducted by injecting a carrier (an electron or a positive hole) from a probe electrode into a charge accumulating region to change an electronic state or a charge state of the region, and reproducing the recorded information by detecting the above change as a change of a current or a voltage by use of a probe electrode.

For formation of the charge accumulating region, any material may be used which has a sufficient level density to be occupied by the injected carriers. The levels need not be continuously distributed, but may be trapping levels such as levels at a surface or an interface or levels of an impurity. Application of a semiconducting substance or an insulating substance is preferable. The substance may be either inorganic or organic.

The charge accumulating region is preferably divided physically, whereby delocalization of the recorded or accumulated charge may be restricted and recording density which is dependent on the spreading size of the charge can be made higher, and further an information loss caused by charge diffusion with lapse of time can be reduced remarkably, improving characteristics.

The charge accumulating region composed of mutually isolated fine structures may be prepared according to a known conventional technique. For example, according to a photolithography technique widely employed in semiconductor industry, an insulating or semiconducting thin film can readily be fabricated to form fine structures having a size of not larger than 100 nanometers. Suitable selection of the material enables formation of the fine structure without patterning. A material having molecules or molecular assembly arranged in a column state or a cluster state, such as a bacteriorhodopsin film and inorganic ultra-fine particle film has generally characteristics of remarkable low electroconductivity between the molecules or the boundaries in comparison with the electroconductivity within the molecules or the assembly. Accordingly, fine structures isolated electrically mutually can readily be formed without patterning treatment. Furthermore, such materials is superior in controllability and reproducibility of the size of the fine structures, and are extremely preferable for the present invention.

The photoconductive thin film held between the above-mentioned charge accumulating region and the underlying electrode is required to be sufficiently thin and uniform to allow a tunnel current to flow. Specifically, the thickness is preferably not more than 100 nm and not less than 0.3 nm, More preferably, at a thickness of not more than 30 nm and not less than 0.3 nm, sufficient tunnel current can be made to flow without short-circuiting the electrodes. The materials constituting the thin film and the method for forming it are not limited at all in the present invention. Examples of the applicable materials include inorganic semiconducting materials such as Si, GaAs, CdSe, CdS, ZnS, and the like which are typical photoconductive material, and a variety of photoconductive organic compounds having high freedom for material design. Further, the object of the present invention is achieved by known conventional film-forming means such as usual vapor deposition, molecular beam epitaxy, sputtering, coating, and so forth.

In preferable embodiment of the present invention, the thin film employed is constituted by a monomolecular film or a monomolecular built-up film composed of an organic molecule having a hydrophilic site and a hydrophobic site comfined, and exhibiting photoconductivity. The monomolecular film or monomolecular built-up film is extremely convenient for application in the present invention in view of the high orderliness thereof and ease of formation of uniform and defectless ultra-thin film. Specific examples are known organic dye molecules having a hydrophilic moiety and a hydrophobic moiety comfined. Preferable dyes include cyanine dyes, merocyanine dyes, phthalocyanine dyes, triphenylmethane dyes, azulene dyes, and the like. Further, biotic materials such as chlorophyll, rhodamine, chromoprotein such as cytochrome, and the like are also applicable.

A preferable method for forming the organic film layer is a Langmuir-Brodgett method (hereinafter referred to an "LB method"). The LB method may be conducted either by vertical immersion or by horizontal lifting. The film thickness is required in some cases to be several nm or less and be uniform for raising the yield of the tunnel current. The LB method readily gives such a film.

The underlying electrode in the present invention may either be an electroconductive bulk (such as a metal plate, or a semiconductor substrate doped with an impurity) or electroconducting thin film (such as a vapor-deposited metal film) formed on a supporting substrate, which can be prepared according to a known technique. The substrate plate may be of any material such as metal, glass, ceramics, plastics, and the like, and also biotic materials having remarkably low heat resistance. The substrate may be in any shape, not being limited to a flat board shape although a flat shape is preferable. By the aforementioned LB method, the film can advantageously be formed in the same shape as that of the substrate irrespectively of the surface shape of the substrate.

The present invention is described more specifically by referring to Examples.

Incidentally, in FIG. 6 illustrating a conventional recording-reproducing apparatus, the numeral 1 denotes a silicon substrate; 2, a silicon oxide film; 3, a silicon nitride film; 6, electric charges at a position of data 1; and 7, electric charges at the position of data 3.

EXAMPLE 1

Figure 1:
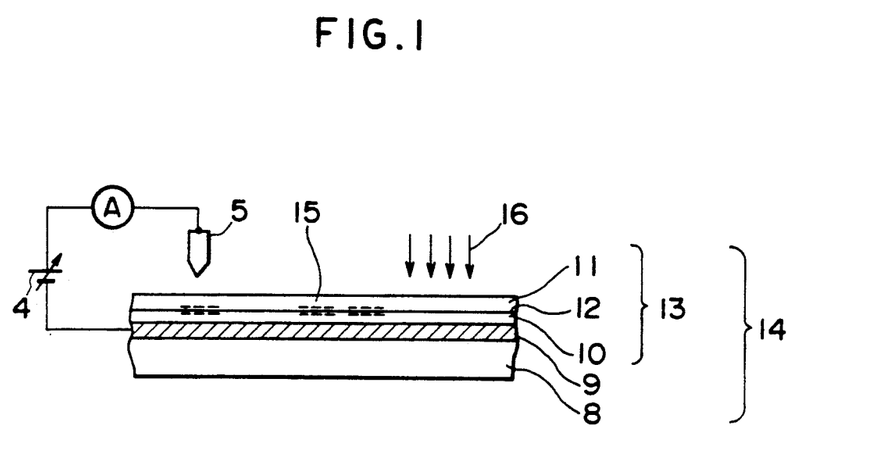
FIG. 1 illustrates an outline of a recording-reproducing-erasing apparatus of the present invention which employs an interface between an insulating thin film and a photoconductive thin film as a recording region and has an optical erasing mechanism.

The present invention is explained based on FIG. 1.

A glass substrate plate 8 (#7059 made by Corning Co.) was used as the support, which had been treated for hydrophobicity by cleaning and keeping standing for one day in a saturated vapor atmosphere of hexamethyl-disilazane. On this substrate, a recording medium 14 was formed which has a laminated structure comprising an underlying electrode 9, a photoconductive thin film 10, and an insulating thin film 11. In this recording medium, an interface level existing at the boundary 12 between the photoconductive thin film 10 and the insulating thin film 11 functions as the electric charge accumulating region. The photoconductive thin film 10 and the insulating thin film 11 are respectively a monomolecular built-up film prepared by an LB method. The recording medium was formed as below.

On the aforementioned glass substrate 8, chromium was deposited in thickness up to 5 nm as a subbing layer, and thereon gold was deposited in thickness up to 30 nm as the underlying electrode 9 respectively by vacuum vapor deposition using a resistance heating method.

Subsequently, the photoconductive layer 10 was formed thereon by building up a pigment monomolecular film according to an LB method as follows. A solution of an azulene pigment derivative (specifically, squarylium-bis-6-octylazulene) in benzene at a concentration of 1 mg/ml was spread over an aqueous phase of pure water at a temperature of 17° C. to form a monomolecular film on the water surface. After the benzene was evaporated off, the surface pressure was raised to 25 mN/m. At this surface pressure kept constant, the substrate plate having the underlying electrode formed thereon was gradually dipped in a direction of the substrate crossing the water surface at a rate of 5 mm/min, and then pulled up gradually at a rate of 5 mm/min to form a two-layered Y-type monomolecular built-up film. The same procedure was repeated for required times to prepare monomolecular built-up films of the azulene pigment derivative constituted of 2, 4, 6, and 8 layers (1.5 nm thick per layer).

Further thereon, an insulating monomolecular film 11 was laminated from arachidic acid molecules to form an electric charge accumulating region 12 at the interface with the photoconductive layer. The arachidic acid film was laminated in a similar manner as for the azulene pigment film according to the LB method at a water temperature of 17° C. and a surface pressure of 25 mN/m by using chloroform as the spreading solvent at a built-up rate of 10 mm/min to form a two-layered film (film thickness of 5.5 nm).

Recording and reproduction was conducted by STM on the recording medium 14 prepared as above and having a recording layer 13 composed of films 10, 11, and 12. The results are shown in Table 1. The recording was conducted with the STM probe electrode 5 kept close sufficiently to the underlying electrode 9 by injecting an electric charge by applying a pulse voltage of 5 volts and 200 ns between the STM probe 5 and the underlying electrode 9. Thereafter, the probe was once removed from the recorded portion, and again brought close to the recording medium for reproducing operation and made scan the recording medium in a direction parallel to the surface thereof. Consequently, it was confirmed that the tunnel current flowing between the underlying electrode and the probe increases at the site 15 having the previously accumulated charge. In more detail, in the case where the bias voltage given by a voltage applying apparatus 4 in reproduction is 100 mV, the tunnel current was found to increase by a factor of from two to several tens at the recorded site (or the pulse voltage-applied site). The recording medium having a two-layered monomolecular built-up film was found to tend to lose the recorded information during a time lapse (e.g., by being left standing for 24 hours).

For erasing the information, light 16 having a central wavelength of about 650 nm was projected from above the recording medium. After this operation, the probe was again brought to close to the recording medium to observe the accumulation of the charge, and it was found that the previously accumulated charge had dissipated and the information had been erased. The results are shown also in Table 1.

Even after repetition of the above operation, the probe could be brought close to the recording face without destroying the recording layer, and recording, reproduction and erasure could readily be conducted.

TABLE 1

| Number of layers of monomolecular built-up film | Recording-reproducing characteristics | Erasing characteristics |
| --- | --- | --- |
| 2 | Good | Passing |
| 4 | Excellent | Excellent |
| 6 | Excellent | Excellent |

TABLE 1-continued

| Number of layers of monomolecular built-up film | Recording-reproducing characteristics | Erasing characteristics |
| --- | --- | --- |
| 8 | Excellent | Excellent |

EXAMPLE 2

Figure 2:
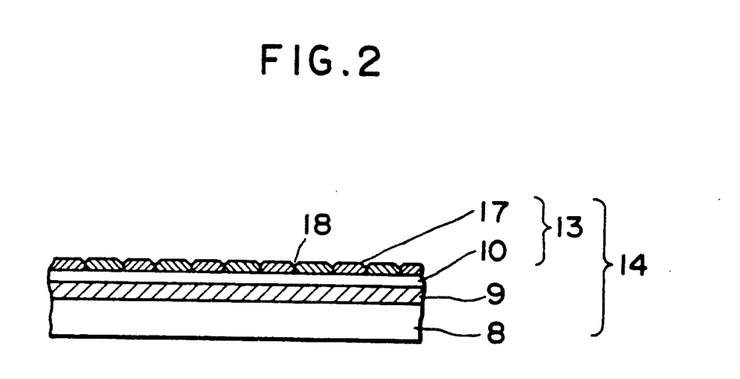
FIG. 2 illustrates an outline of a cross-section of a recording medium of the present invention which has a grain-like upper fine electrode as a recording region.

A recording medium, which has a lamination structure composed of an underlying electrode 9, a photoconductive thin film 10, and a grain-like semiconductor thin film 17 for electric charge accumulation, was formed on a glass substrate 8 (#7059, made by Corning Co.) in the same manner as in Example 1. The outline of the structure is shown in FIG. 2.

The photoconductive film 10 was made of a monomolecular built-up film of a phthalocyanine derivative (specifically, t-butyl copper phthalocyanine). The monomolecular built-up film was prepared as described below.

A powdery phthalocyanine derivative was dissolved in chloroform at a concentration of 0.2 mg/ml, and spread on a surface of a water phase at a temperature of 20° C. to form a monomolecular film. After removal of the solvent by evaporation, the surface pressure of the monomolecular film was raised up to 20 mN/m. At this surface pressure kept constant, the substrate plate having the underlying electrode vapor-deposited thereon was gradually dipped into the aqueous phase in a direction of the substrate crossing the water surface at a rate of 10 mm/min, and then pulled up gradually at a rate of 5 mm/min to form a two-layered Y-type monomolecular built-up film on the substrate. The same procedure was repeated four times to prepare a monomolecular built-up film having 8 layers.

On the other hand, an ultra-fine silicon particle film was employed as the semiconducting thin film, which was formed by decomposing gaseous $SiH_4$ by plasma in a vacuum chamber and depositing it on the above-mentioned photoconductive film 10 in a thickness of 5 nm, and then being left standing at 60° C. and 85% RH for 24 hours to oxidize the surface of the ultrafine particle by water vapor. In this semiconducting thin film, grain boundaries 18 exist between the micro-structures. The interface between the electrically isolated micro-structures and the photoconductive thin film 10 functions as the charge accumulating region. As described above, spreading of the electric charge at the recording and the accumulation was suppressed by physically dividing the charge accumulating region. Thereby recording density, which has been limited by the size of the charge spreading, can be improved, and the information loss caused by charge diffusion during lapse of time can be remarkably improved.

Recording and reproduction were conducted with the recording medium 14 prepared as above and having the recording layer 13 composed of the portions of 10 and 17 by STM in the same manner as in Example 1. Consequently, the probe was readily brought close to the recording face without destroying the recording layer, and recording were readily conducted. The probe was once removed from the recorded sites, and again brought close to the recording medium for reproducing the recorded information, and the reproduction was readily conducted. Further, the accumulated charge was found to be erased by light projection as in Example 1.

Observation of the recording medium by scanning electron microscopy revealed that the respective recording region (namely the ultra-fine Si particles) is not larger than about 10 nm in diameter, with the smallest region of several nm in diameter, which corresponds to $10^{-5}$ $\mu m^2$ in area, and the recording density was found to be improved by one digit or more in comparison with the recording-reproducing apparatus of Quate mentioned before, with the readiness of the formation of the recording medium.

EXAMPLE 3

Figure 3:
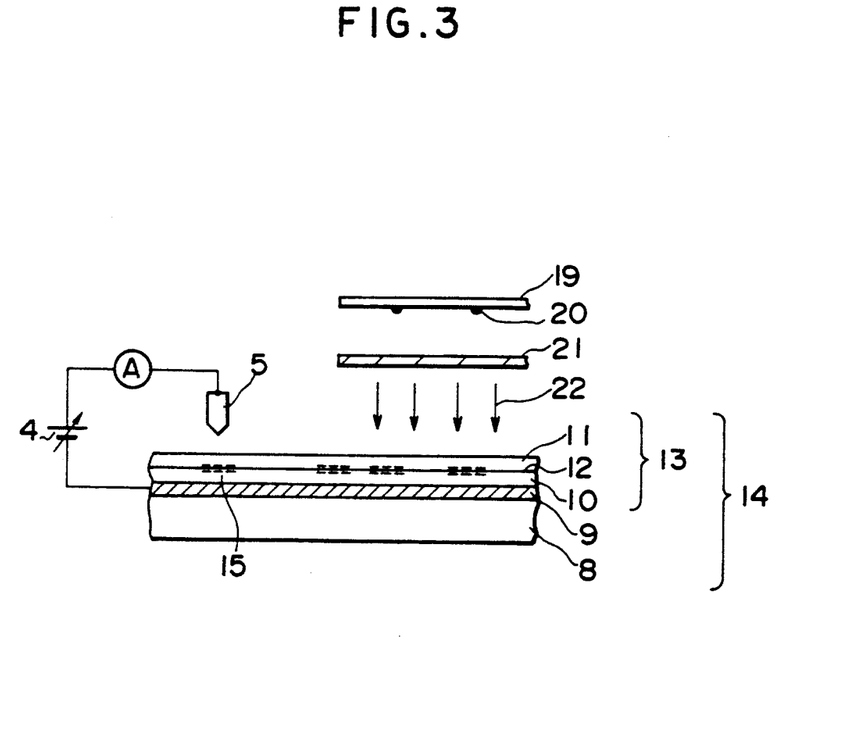
FIG. 3 illustrates an outline of a recording-reproducing-erasing apparatus which erases recorded information by projecting light from an LED.
Figure 4:
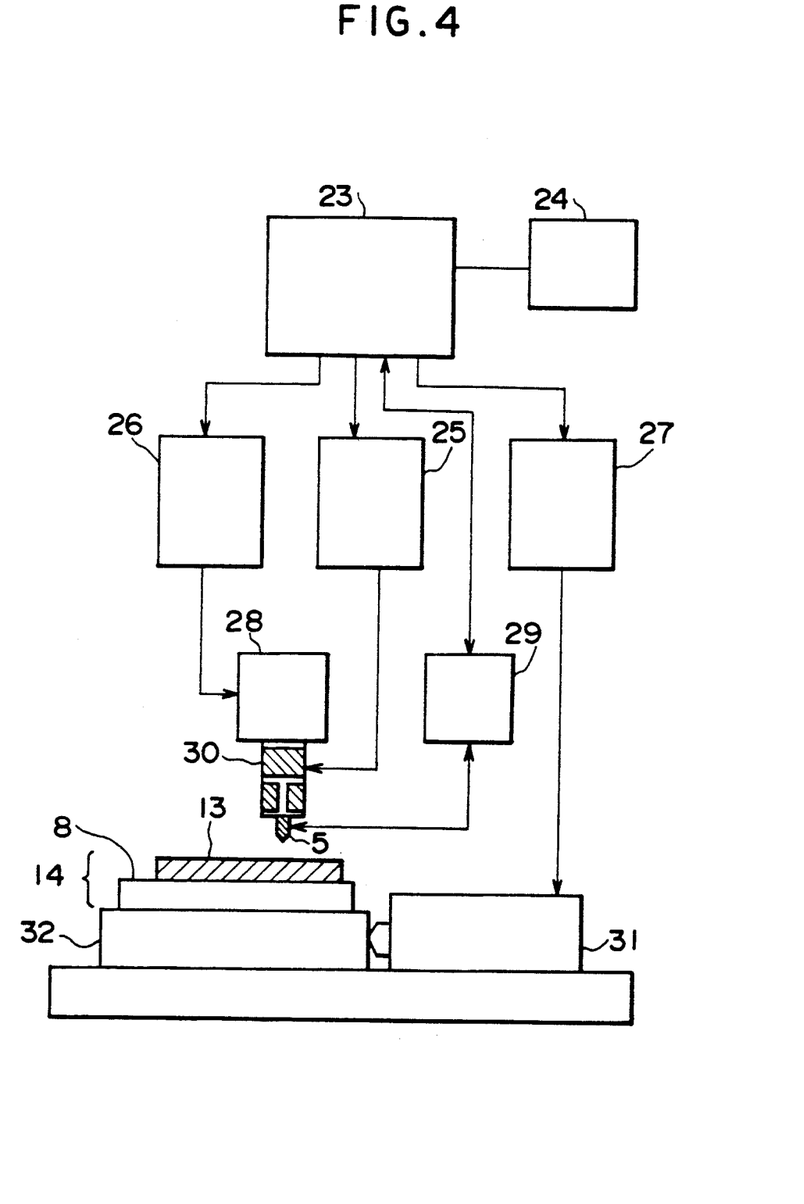
FIG. 4 illustrates a block constitution of an STM employed as a recording-reproducing-erasing apparatus.

By use of the recording medium having four monomolecular built-up film layers out of the recording mediums of Example 1, recording and reproduction were conducted with the recording-reproducing apparatus shown by the block constitution diagram in FIG. 4, and erasure was conducted as shown in FIG. 3.

In FIG. 3, the numeral 19 indicates a support for LED; 20, an LED; 21, a scattering plate; and 22, projected light.

In FIG. 4, the numeral 23 denotes a microcomputer; 24, a display device; 25, a servo and scanning circuit; 26, a Z-direction coarse driving circuit; 27, an XY-direction coarse driving circuit; 29, a bias voltage source and a probe current amplifier; and 30, a fine movement control mechanism.

The recording medium 14 was fixed on an XY-stage 32. The XY-stage can be displaced horizontally at an accuracy of about 0.1 $\mu m$ within a range of 2 mm by an XY-direction coarse driving mechanism 31. Firstly a region on the recording medium was selected, and the probe 5 was brought near to the recording medium 14 by use of the Z-direction coarse driving mechanism 28. Further the probe was brought to closer to the surface of the recording medium at a distance of 1 nm or less by using the servo circuit 25. In this state, a pulse voltage of 5 volts and 200 ns was applied to the probe electrode to inject an electric charge into the recording layer 13 to conduct recording. The probe was then once removed from the recorded site, and again brought close the recording medium for reproduction. The probe was made to scan the surface of the recording medium in a direction parallel to the surface, reading out the recorded data according to the intensity of the tunnel current flowing through the probe. As the result, the tunnel current was confirmed to increase at the sites 15 (in FIG. 3) having electric charge previously accumulated. Detailedly, at a bias voltage of 100 mV, the tunnel current was found to increase by about one digit at the recorded sites (the pulse-voltage applied positions).

Erasing was then conducted as follows. Onto the recording medium kept fixed on the XY-stage of the recording-reproducing apparatus, light 22 was projected from a red LED 20 supported by an LED supporter 19 through a milky white scattering plate 21. The scattering plate 21 (transmissivity: 70%) was provided between the LED and the recording medium for the purpose of illuminating the whole recording medium uniformly. Thereafter the light projecting device was removed away, and the probe 5 was again brought close to the recording medium to observe the accumulation of the charge thereon. The charge which had been accumulated was found to have disappeared. That is, the recorded information was erased by light projection.

Even after repetition of the above operation, the probe could be brought close to the recording face without destroying the recording layer, and recording, reproduction and erasure were readily conducted.

EXAMPLE 4

Figure 5:
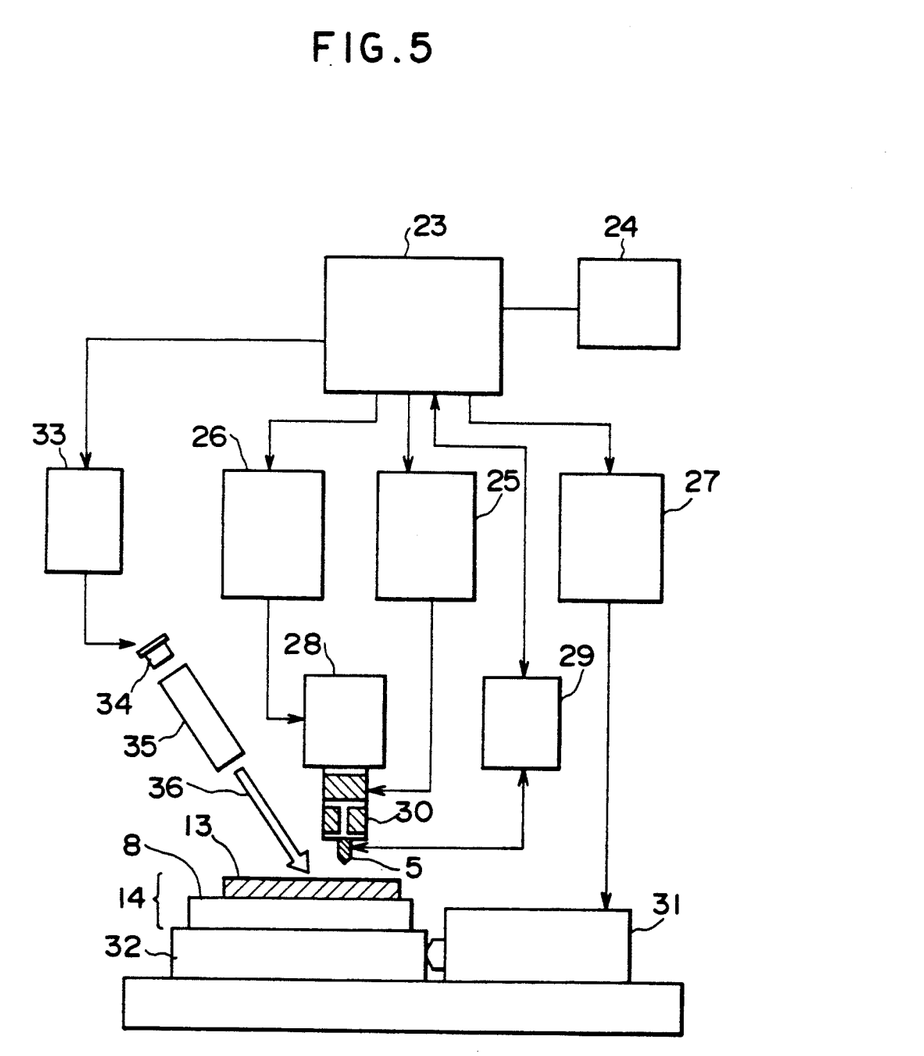
FIG. 5 illustrates a block constitution of a recording-reproducing apparatus having combinedly an erasing apparatus by use of a laser beam.

By use of the recording medium prepared in Example 2, recording and erasure of data were conducted in the same manner as in Example 3. The block constitution diagram of the apparatus employed is shown in FIG. 5, wherein the numeral 33 indicate a laser driving power source. This experiment was different from Example 3 in that a light beam 36 was used which is an output light beam (the central wavelength of about 650 nm and power of about 4 mw) irradiated from a semiconductor laser 34 and collimated to a beam diameter of about 1 $\mu m$ by a collimetor 35. The light was projected from above obliquely, so that the probe and the related devices need not be taken away for the light projection. In the recording operation, the probe could readily be brought close to the recording face without destroying the recording medium or the recording region, and a charge was readily accumulated by voltage application as in Example 1 (being confirmed by reproduction operation). Furthermore, upon light projection with the above-mentioned apparatus, the accumulated charge was found to disappear. Thus recording and erasure of information were found to be readily conducted also with this apparatus.

In this Example, the light-projected region was in a spot shape limited by the diameter of the beam. However, the light beam can readily made to scan a broad range to project light by moving horizontally the XY-stage holding the recording medium 14 with the light source being kept fixed. Specifically this can be achieved by employing the coarse horizontal driving mechanism 31 of the recording-reproducing apparatus. A driving system for the coarse driving mechanism, which has a resolution and precision of 0.1 $\mu m$ level or less like the linear actuator employed in this Example, is generally most suitable for the mechanism for light beam scanning by relative movement of the recording medium. In combination of a recording apparatus and an erasing apparatus, the use of such a system can prevent complication and enlargement of the mechanism and the whole system, since a scanning mechanism need not be provided separately.

In the case where recording and light erasing are required to be conducted simultaneously and nonsynchronously, the object of the present invention can be achieved by providing a light scanning mechanism, such as a light beam system employing a conventional mirror, independently of the coarse driving mechanism. The mechanism or the type of scanning does not restrict the present invention at all.

The present invention provides an information processing apparatus having a simple erasing mechanism and capable of high-density recording (from $10^{-5}$ to $10^{-6}$ $\mu m^2$ per bit). The information processing apparatus is also capable of erasing numbers of bits simultaneously, exhibiting higher reproducibility in erasure of a large quantity of data, and higher response speed in erasing process.

The information processing apparatus of the present invention does not require such a complicated pattern or a matrix-circuit as employed usually in semiconductor memories, thus being suitable for miniaturization of not only a recording medium but also the whole apparatus. Moreover, the apparatus of the present invention gives remarkable economical effect since an inexpensive organic material may be used for the recording medium, and the production process is simple.

What is claimed is:

1. An information processing apparatus comprising: (a) a recording medium having at least (i) an underlying electrode, (ii) a photoconductive thin film on said underlying electrode and (iii) an insulating or semiconducting recording region capable of accumulating an electric charge overlying said photoconductive thin film; (b) a probe electrode capable of imparting and detecting said electric charge; and (c) a relative distance controlling mechanism for controlling distance between the recording region and the probe electrode in three dimensions.

2. An information processing apparatus comprising: (a) a recording medium having at least a photoconductive thin film layer formed on an underlying electrode and an insulating or semiconducting recording region capable of accumulating an electric charge overlying said photoconductive thin film; (b) a light-projecting mechanism for projecting light onto the recording medium; and (c) a probe electrode capable of imparting and detecting said electric charge; and (d) a relative distance controlling mechanism for controlling distance between the recording region and the probe electrode in three dimensions.

3. The information processing apparatus of claim 1 or claim 2, wherein said recording region capable of accumulating an electric charge is comprised of mutually isolated fine structures.

4. The information processing apparatus of claim 1 or claim 2, comprising a bias voltage applying mechanism for applying a bias voltage between the underlying electrode and the probe electrode.

5. The information processing apparatus of claim 1 or claim 2 wherein said controlling mechanism is a mechanism for detecting and controlling the distance between the recording region and the probe electrode according to the intensity of electric current flowing between the underlying electrode and the probe electrode on application of a bias voltage.

6. The information processing apparatus of claim 1 or claim 2, wherein said photoconductive thin film is composed of an organic material.

7. The information processing apparatus of claim 6, wherein said photoconductive thin film composed of the organic material has a thickness of not more than 30 nm.

8. The information processing apparatus of claim 6, wherein said photoconductive thin film composed of the organic material is comprised of a monomolecular film or a monomolecular built-up film of an organic compound having at least a hydrophilic moiety and a hydrophobic moiety.

9. The information processing apparatus of claim 1 or claim 2, wherein said recording region comprises an insulating or semiconducting and polycrystalline or microcrystalline medium having a grain structure.

10. An information processing method, comprising the steps of: (a) employing (a-1) a recording medium having at least (i) an underlying electrode, (ii) a photoconductive thin film on said underlying electrode and (iii) an insulating or semiconducting recording region capable of accumulating an electric charge overlying said photoconductive thin film, and (a-2) a probe electrode capable of imparting and detecting said electric charge; and (b) recording information by applying a voltage between the underlying electrode and the probe electrode to inject the electric charge into the recording region, whereby high density recording with bit sizes from $10^{-5}$ to $10^{-6}$ $\mu m^2$ is facilitated.

11. An information processing method, comprising the steps of: (a) employing (a-1) a recording medium having at least (i) an underlying electrode, (ii) a photoconductive thin film on said underlying electrode and (iii) an insulating or semiconducting recording region capable of accumulating an electric charge overlying said photoconductive thin film, and (a-2) a probe electrode capable of imparting and detecting said electric charge; (b) recording information by applying a voltage between the underlying electrode and the probe electrode to inject the electric charge into the recording region; and (c) reproducing recorded information by detecting an quantity of the electric charge in the recording region by the probe electrode.

12. An information processing method, comprising: (a) employing (a-1) a recording medium having at least (i) an underlying electrode, (ii) a photoconductive thin film on said underlying electrode and (iii) an insulating or semiconducting recording region capable of accumulating an electric charge overlying said photoconductive thin film, and (a-2) a probe electrode capable of imparting and detecting said electric charge; (b) recording information by applying a voltage between the underlying electrode and the probe electrode to inject the electric charge into the recording region; and (c) erasing the recorded information by projecting light to the recording region to raise temporarily electroconductivity of the photoconductive thin film to discharge the accumulated electric charge through the photoconductive thin film.

13. An information processing method, comprising the steps of: (a) employing (a-1) a recording medium having at least (i) an underlying electrode, (ii) a photoconductive thin film on said underlying electrode and (iii) an insulating or semiconducting recording region capable of accumulating an electric charge overlying said photoconductive thin film, and (a-2) a probe electrode capable of imparting and detecting said electric charge; (b) recording information by applying a voltage between the underlying electrode and the probe electrode to inject the electric charge into the recording region; (c) reproducing recorded information by detecting a quantity of an accumulated electric charge in the recording region by the probe electrode; and (d) erasing the recorded information by projecting light to the recording region to raise temporarily electroconductivity of the photoconductive thin film to discharge the accumulated electric charge through the photoconductive thin film.

14. A recording medium for information processing including recording, reproduction, and erasure of information by employing a probe electrode capable of imparting and detecting information accumulated as an electric charge; the medium comprising at least a photoconductive thin film layer formed on an underlying electrode and an insulating or semiconducting recording layer capable of accumulating said electric charge overlying said photoconductive thin film layer, wherein said recording layer is comprised of mutually isolated fine structures, whereby said recording medium is capable of high density recording from $10^{-5}$ to $10^{-6}$ $\mu m^2$ per bit.

15. The recording medium of claim 14, wherein said photoconductive thin film is composed of an organic material.

16. The recording medium of claim 15, wherein said photoconductive thin film composed of the organic material has a thickness of not more than 30 nm.

17. The recording medium of claim 14, wherein said photoconductive thin film is comprised of a monomolecular film or a monomolecular built-up film of an organic compound having at least a hydrophilic moiety and a hydrophobic moiety.

18. The recording medium of claim 14, wherein said recording layer comprises an insulating or semiconducting and polycrystalline or microcrystalline medium having a grain structure.

* * * * *

UNITED STATES PATENT AND TRADEMARK OFFICE
CERTIFICATE OF CORRECTION

PATENT NO. : 5,162,819
DATED : November 10, 1992
INVENTOR(S) : KUNIHIRO SAKAI, ET AL.

Page 1 of 2

It is certified that error appears in the above-identified patent and that said Letters Patent is hereby corrected as shown below:

COLUMN 1

Line 45, "computors" should read --computers--.

COLUMN 2

Line 12, "flowing the" should read --flowing through the--.
Line 59, "be" (second occurrence) should be deleted.

COLUMN 3

Line 4, "have" should read --has--.
Line 26, "recording-region" should read --recording region--.

COLUMN 5

Line 33, "generally" should read --general--.
Line 39, "is" should read --are--.
Line 62, "preferable" should read --a preferable--.
Line 66, "comfined," should read --combined,--.

COLUMN 6

Line 5, "comfined." should read --combined.--.
Line 12, "Langmuir-Brodgett" should read --Langmuir-Blodgett--.
Line 13, "an" should read --as--.

COLUMN 7

Line 36, "made" should read --made to--.

UNITED STATES PATENT AND TRADEMARK OFFICE
CERTIFICATE OF CORRECTION

PATENT NO. : 5,162,819
DATED : November 10, 1992
INVENTOR(S) : KUNIHIRO SAKAI, ET AL.

It is certified that error appears in the above-identified patent and that said Letters Patent is hereby corrected as shown below:

COLUMN 9

Line 35, "to" (first occurrence) should be deleted.
Line 41, "close" should read --close to--.

COLUMN 10

Line 15, "collimetor 35." should read --collimater 35.--.

COLUMN 11

Line 22, "and" should be deleted.
Line 36, "claim 2" should read --claim 2,--.

COLUMN 12

Line 16, "an" should read --a--.
Line 18, "comprising:" should read --comprising the steps of:--.

Signed and Sealed this

Twenty-third Day of November, 1993

Attest:

BRUCE LEHMAN

*Attesting Officer*      *Commissioner of Patents and Trademarks*